Oct. 26, 1926.
J. H. WIELAND
CONNECTER
Filed April 29, 1926
1,604,542
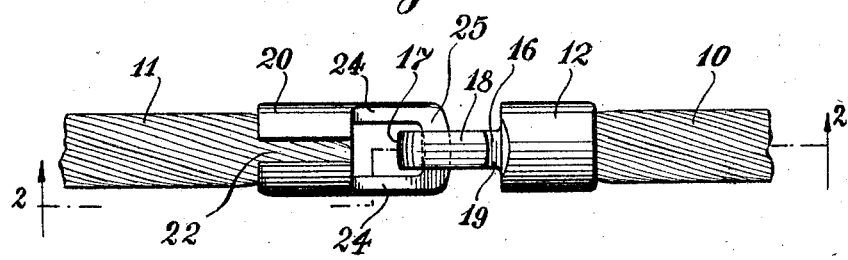
Fig. 1
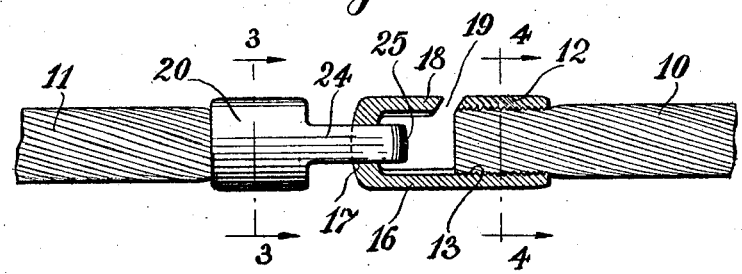
Fig. 2
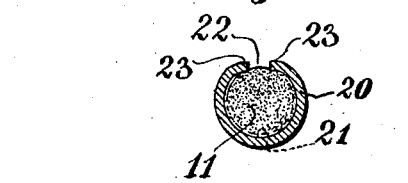
Fig. 3
Fig. 4
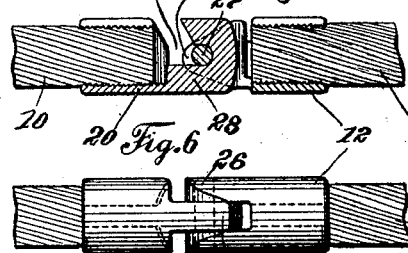
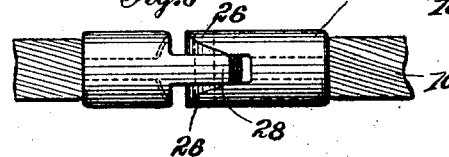
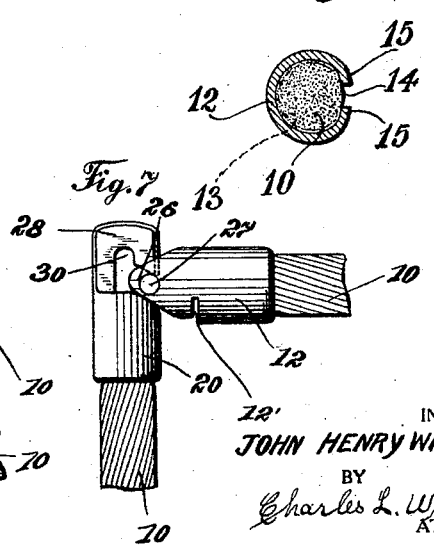
INVENTOR
JOHN HENRY WIELAND
BY
Charles L. Wright
ATTORNEY Patented Oct. 26, 1926.

1,604,542

UNITED STATES PATENT OFFICE.

JOHN HENRY WIELAND, OF WEST NEW YORK, NEW JERSEY.

CONNECTER.

Application filed April 29, 1926. Serial No. 105,525.

This invention relates to connecters and more particularly to types used in securing the ends of flexible elements of circular cross section together, such for instance as cords, lines, ropes, belts, etc.

It is one object of the present invention to produce a simple efficient and easily applied device, consisting merely of two parts, capable of being inter-connected or disconnected at will.

A further feature is in the provision of means for securely fastening the shanks of the connecting means in a positive manner to the ends of the parts to be connected.

Another aim is to provide an inexpensive device for the purpose, of adequate strength, flexibility and of good appearance.

These several features are accomplished by the novel and practical construction and arrangement of parts hereinafter described and shown in the accompanying drawing, forming a material part of this disclosure, and in which:—

Figure 1 is a side elevational view of an embodiment of the invention, illustrating its application.

Figure 2 is a similar view of the same, the parts being turned at a right angle from the position shown in Figure 1, and partially in section, the view being taken on line 2—2 of Figure 1.

Figure 3 is a transverse sectional view taken on line 3—3 of Figure 2.

Figure 4 is a similar view taken on line 4—4 of Figure 2.

Figure 5 is a longitudinal sectional view of a modified form of fastener construction.

Figure 6 is a side elevational view of the same, turned at a right angle to Figure 5.

Figure 7 is a similar side view, showing the position of parts in forming or breaking connections.

In the several views the numeral 10 designates one end of a yieldable object, generally of circular cross section, as represented, by a pliable cord, and 11 the other end of the same or a similar object which it is desired to connect together in end registration.

The connecting device consists of an essentially cylindrical socket or sleeve 12 having sharp internal screw threads 13, and cut lengthwise to present a space 14 between the cut edges, the walls of the socket being yieldable so that after screwing a cord into the socket a suitable distance the wall edge may be closed inwardly, as at 15, to attain a biting grip preventing unscrewing or pulling the socket off.

Extending integrally from one side of the socket body, is a projection 16, disposed at a right angle to the space 14 and terminating in a cross bar 17, thicker than the projection, and having a down-turned extension 18 which reaches to a narrow slot 19 formed between its end and the adjacent end wall of the body, this structure being best shown in Figure 2.

It will be readily apparent that the foregoing constitutes a hook having a narrow entrance and an elongated bight, integral with the socket.

The other member has a corresponding socket 20, internally threaded at 21, and a space 22 between its crimped longitudinal edges 23; reaching outward from the socket is a loop comprised of a pair of equal arms 24 connected by a cross plate 25.

It will now be understood that when the sockets have been fixed on the ends of the cords that the parts may be so maneuvered as to cause one of the side arms 24 to enter the opening 19 and thereafter the bights of the hook and loop engage under any tensile strain that may be imparted to the cords.

In the modified form of coupler shown in Figures 5, 6 and 7, the threaded and longitudinally slit sockets remain the same, the socket 12 being further provided with a transverse cut 12' to render the socket wall more readily yielding.

Projecting from the socket 12 are a pair of oppositely disposed arms 26, of substantially triangle contour, and set in these arms to extend therebetween is a rigid pin 27.

Extending from the mating socket 20 is a stout hook 28 turned to present a space 29 leading to an elongated bight 30, the space and bight being of such proportions as to admit the pin 27 without material looseness, and the thickness of the hook 28 is equivalent to the opening between the arms 26, thereby providing a stronger form of connection.

It is to be noted that no pins, rivets or analogous fastening means are used, the combined grip of the sharp internal threads in the sockets and inbent elements 15 and 23 being ample to positively secure them on the cords which may be cramped to any extent required.

Although the foregoing is descriptive of the preferred embodiment of the invention, it will be apparent that minor changes may be made in its construction, without the exercise of invention or conflicting with the scope of the claims hereto appended.

Having thus described my invention, what I claim as new and desire to secure by Letters Patent, is:—

1. A connecter for cords comprising a pair of sockets having sharp internal screw threads to engage over the ends, the walls of said sockets being longitudinally slotted, a loop extending from one of said sockets, the walls of said loop being disposed at right angles to the slot, and a hook extending from the other of said sockets, the entrance to the bight of said hook being adjacent the end of the socket and not exceeding the thickness of the side walls of said loop.

2. A connecter for cords comprising a pair of sockets having sharp internal corrugations to pass over the ends of a cord, said sockets being longitudinally slotted permitting contraction to grip the cord, a pair of arms extending from one of said sockets, a pin fixed to extend between said arms, and a hook on the other of said sockets, said hook having an entrance opening and elongated bight to neatly receive said pin.

Signed at New York in the county of New York and State of New York, this 16th day of April A. D. 1926.

JOHN H. WIELAND.